United States Patent
Bose et al.

(10) Patent No.: US 9,594,558 B2
(45) Date of Patent: *Mar. 14, 2017

(54) SILENT STORE DETECTION AND RECORDING IN MEMORY STORAGE

(71) Applicant: International Business Machines Corporation, Armonk, NY (US)

(72) Inventors: Pradip Bose, Yorktown Heights, NY (US); Chen-Yong Cher, Port Chester, NY (US); Ravi Nair, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,946

(22) Filed: Aug. 24, 2016

(65) Prior Publication Data

US 2016/0378403 A1    Dec. 29, 2016

Related U.S. Application Data

(63) Continuation of application No. 15/086,974, filed on Mar. 31, 2016, now Pat. No. 9,448,798, which is a continuation of application No. 14/749,680, filed on Jun. 25, 2015.

(51) Int. Cl.
  *G06F 9/30* (2006.01)
  *G06F 9/38* (2006.01)

(52) U.S. Cl.
  CPC ........ *G06F 9/30043* (2013.01); *G06F 9/3863* (2013.01)

(58) Field of Classification Search
  CPC ................. G06F 9/30043; G06F 9/3863
  See application file for complete search history.

(56) References Cited

U.S. PATENT DOCUMENTS

| 8,370,609 | B1 | 2/2013 | Favor et al. | |
| 9,448,798 | B1* | 9/2016 | Bose | G06F 9/30043 |
| 2002/0124156 | A1* | 9/2002 | Yoaz | G06F 9/3834 712/225 |

(Continued)

OTHER PUBLICATIONS

Lepak et al. "On the Value Locality of Store Instructions." Jun. 2000. IEEE. ISCA 2000.*

(Continued)

*Primary Examiner* — Nathan Sadler
(74) *Attorney, Agent, or Firm* — Cantor Colburn LLP

(57) ABSTRACT

An aspect includes receiving a write request that includes a memory address and write data. Stored data is read from a memory location at the memory address. Based on determining that the memory location was not previously modified, the stored data is compared to the write data. Based on the stored data matching the write data, the write request is completed without writing the write data to the memory and a corresponding silent store bit, in a silent store bitmap is set. Based on the stored data not matching the write data, the write data is written to the memory location, the silent store bit is reset and a corresponding modified bit is set. At least one of an application and an operating system is provided access to the silent store bitmap.

1 Claim, 6 Drawing Sheets

(56) References Cited

U.S. PATENT DOCUMENTS

| | | | |
|---|---|---|---|
| 2008/0052469 A1* | 2/2008 | Fontenot | G06F 12/0833 711/133 |
| 2009/0210633 A1* | 8/2009 | Kundinger | G06F 12/0833 711/141 |
| 2009/0210655 A1* | 8/2009 | Barrick | G06F 9/30043 712/26 |
| 2011/0055471 A1 | 3/2011 | Thatcher et al. | |
| 2011/0225375 A1 | 9/2011 | Rajwar et al. | |

OTHER PUBLICATIONS

Bell et al. "Characterization of Silent Stores." Oct. 2000. IEEE. PACT 2000.*

Kevin M. Lepak. Exploring, Defining, and Exploiting Recent Store Value Locality. 2003. University of Wisconsin—Madison. Thesis.*

Kucuk et al. "Reducing Energy Dissipation of Wireless Sensor Processors Using Silent-Store-Filtering MoteCache." 2006. Springer-Verlag. PATMOS 2006. LNCS 4148. pp. 256-266.*

\* cited by examiner

| INITIAL STATE | | INCOMING STORE IS SILENT? | NEW STATE | |
|---|---|---|---|---|
| MODIFIED BIT | SILENT STORE BIT | | MODIFIED BIT | SILENT STORE BIT |
| 0 | 0 | YES | 0 | 1 |
| 0 | 0 | NO | 1 | 0 |
| 0 | 1 | YES | 0 | 1 |
| 0 | 1 | NO | 1 | 0 |
| 1 | 0 | YES | 1 | 0 |
| 1 | 0 | NO | 1 | 0 |
| 1 | 1 | YES | N/A | N/A |
| 1 | 1 | NO | N/A | N/A |

FIG. 4

SILENT STORE DETECTION AND RECORDING IN MEMORY STORAGE

CROSS-REFERENCE TO RELATED APPLICATIONS

This application is a continuation of U.S. Non-Provisional application Ser. No. 15/086,974, entitled "SILENT STORE DETECTION AND RECORDING IN MEMORY STORAGE", by Pradip Bose, et al., filed Mar. 31, 2016, now U.S. Pat. No. 9,448,798, which application claims priority to U.S. patent application Ser. No. 14/749,680 entitled, "SILENT STORE DETECTION AND RECORDING IN MEMORY STORAGE", by Pradip Bose, et al., filed Jun. 25, 2015, of which both applications are assigned to the current assignee hereof and incorporated herein by reference in their entirety.

STATEMENT REGARDING FEDERALLY SPONSORED RESEARCH OR DEVELOPMENT

This invention was made with Government support under B599858 awarded by Department of Energy. The Government has certain rights to this invention.

BACKGROUND

Various embodiments of this disclosure relate to memory storage, and, more particularly, to silent store detection and recording in memory storage.

In many computer applications such as high performance computing and numerical analysis, the same value is written to the same memory location several times. These repeated writes of the same values are referred to as silent stores.

SUMMARY

Embodiments include methods, systems, and computer program products for silent store detection and recording in memory storage. A method includes receiving a write request, the write request including a memory address and write data. Stored data is read from a memory location at the memory address. It is determined whether previous write requests specifying the memory address resulted in a write to the memory location. The determining is based on a value of a modified bit, in a modified bitmap, that corresponds to the memory address. The modified bit has a value of set when the memory location was previously written to and a value of reset when the memory location was not previously written to. Based on determining that the memory location was not previously written to, the stored data is compared to the write data. Based on the stored data matching the write data, the write request is completed without writing the write data to the memory and a silent store bit, in a silent store bitmap, that corresponds to the memory address is set to indicate that the write request was completed without writing the write data to the memory. Based on the stored data not matching the write data, the write data is written to the memory location, the silent store bit is reset to indicate that the write request was completed by writing the write data to the memory, and the modified bit is set to indicate that the write request was completed by writing the write data to the memory location. Based on determining that the memory location was previously written to: the write data is written to the memory location, the silent store bit is reset to indicate that the write request was completed by writing the write data to the memory, and the modified bit is set to indicate that the write request was completed by writing the write data to the memory location. At least one of an application and an operating system is provided access to the silent store bitmap.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 is block diagram of a state diagram of settings for a modified bit and a silent store bit in accordance with an embodiment;

DETAILED DESCRIPTION

Various embodiments of this disclosure relate to the detection and recording of silent stores. By using a bitmap to track silent stores, embodiments provide for the tracking and recording of silent stores at a large granularity when compared to contemporary solutions which are limited to tracking silent stores across a fixed number of instructions (e.g., 10, 20). In addition, embodiments provide applications and operating systems with access to the silent store bitmap, thereby allowing them to have visibility into current silent store activity.

Figure 1:
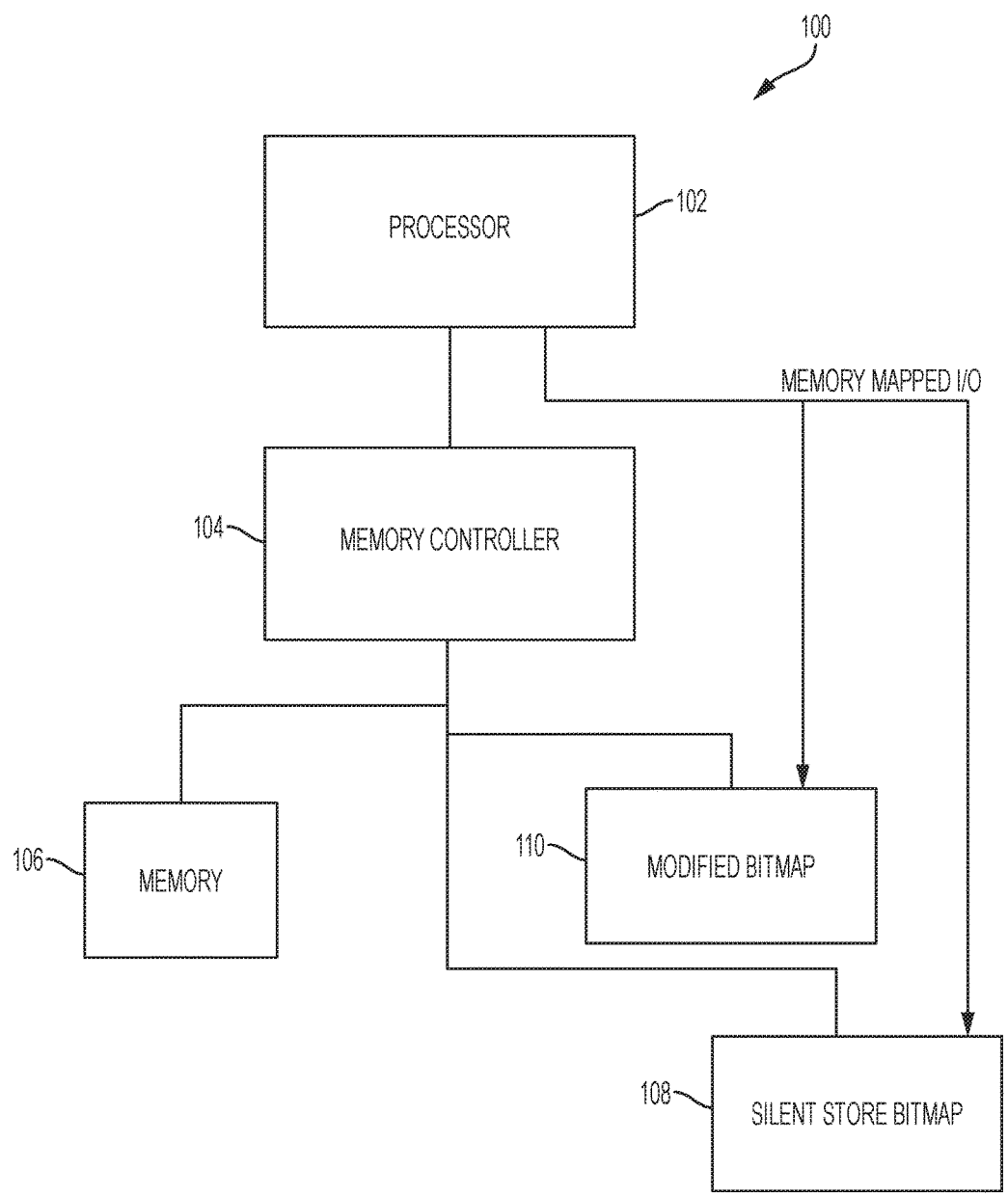
FIG. 1 is a block diagram of a system for silent store detection and recording in memory storage in accordance with an embodiment.

Turning now to FIG. 1, a block diagram of a system 100 for silent store detection and recording in memory storage is generally shown in accordance with an embodiment. The system 100 includes a processor 102 that executes an application and/or operating system (OS) that can request access to data stored in a memory 106. Requests of reads or writes to the memory 106, from the processor 102, are sent to a memory controller 104 for processing. The memory controller 104 can perform a number of tasks including, but not limited to, translation of virtual addresses to real addresses, and buffering of requests. In embodiments described herein, the memory controller 104 can also perform silent store detection and recording. Though shown as separate physical components in FIG. 1, one or more of the memory controller 104, the memory 106, the silent store bitmap 108, the modified bitmap 110, and the processor 102 can also be co-located on a single physical component.

In an embodiment, the memory 106 is main memory that is internal to the processor and implemented by a dynamic random access memory (DRAM) device. In an embodiment, the silent store bitmap 106 is stored on a DRAM and/or static random access memory (SRAM) device. In embodiments, the silent store bitmap 106 is located in the memory 106.

As described previously, a silent store occurs when write data received as part of a memory write request is the same as the data already stored (the stored data) at the memory location. In embodiments described herein, the memory controller 104 can interface with a silent store bitmap 108 to record portions of the memory 106 where a silent store has occurred, that is when a write request was completed without physically writing the write data to the memory. The memory controller 104 can also interface with a modified bitmap 110 to record portions of the memory 106 where an non-silent store has occurred. As shown in FIG. 1, contents of the silent store bitmap 108 can be provided to applications and/or OSs executing on the processor 102 via, for example, a memory mapped input/output (I/O).

Embodiments can be utilized by synchronized checkpoints of a computer system, such as a supercomputer system. As used herein, the term "checkpoint" refers to the copying of an application's states to a backup storage at a particular time. To facilitate fault tolerance, the checkpoint can be read in case an error is detected, in order to recover an application state to that particular time in preparation for re-execution. As used herein, the term "supercomputer" refers to a computer system where the computation capacity is large, such that it is more vulnerable to failures than conventional systems due to the sheer number of its components. Supercomputers are also known as high performance computing (HPC) systems. The silent store profile captured in the silent store bitmap 108 can help a user determine which portion of the application data changes frequently. Using this information, the user can schedule checkpoints selectively based on the adaptive frequency of change for different data of the same application. As used herein, the term "adaptive frequency of change" refers to how often the stored values of the application changes due to changes in application activities. The checkpoint schedule can vary based on current (e.g., real-time) information about which data is frequently being updated. In other embodiments, the determining the frequently changing data and scheduling of checkpoints is automated (e.g., performed by a computer).

Embodiments can also be utilized during application tuning for a computer application. Silent store profiling can help a user observe if the chosen time step and interval of the application is sufficient to cause changes in the results. The user can then tune the application based on the profiling, for example, to use a larger time step or interval for the simulations.

Embodiments can further be utilized by synchronous checkpoint restarts of a computer system. Silent store profiling can help a user determine how often the application data changes in order to schedule checkpoints based on the adaptive frequency of change for the application. Determining what portion of the application data to checkpoint can be based on the silent store profile adaptively in real-time and/or based on an off-line profile. After an optimal checkpoint schedule is chosen, at the checkpoint time the user can further benefit from the silent store profile at runtime by copying only changed data.

Generally, techniques that benefit from tracking writes (e.g., using a translation look-aside buffer (TLB) or other means) can further benefit from the silent store recording implemented by embodiments described herein. Embodiments described herein can provide a more precise indication (than, e.g., a TLB) of whether a change has occurred in a data region.

The checkpoint schedule can vary based on current (e.g., real-time) information about which data is frequently being updated. In other embodiments, the determining the frequently changing data and the scheduling of checkpoints is automated (e.g., performed by a computer).

Figure 2:
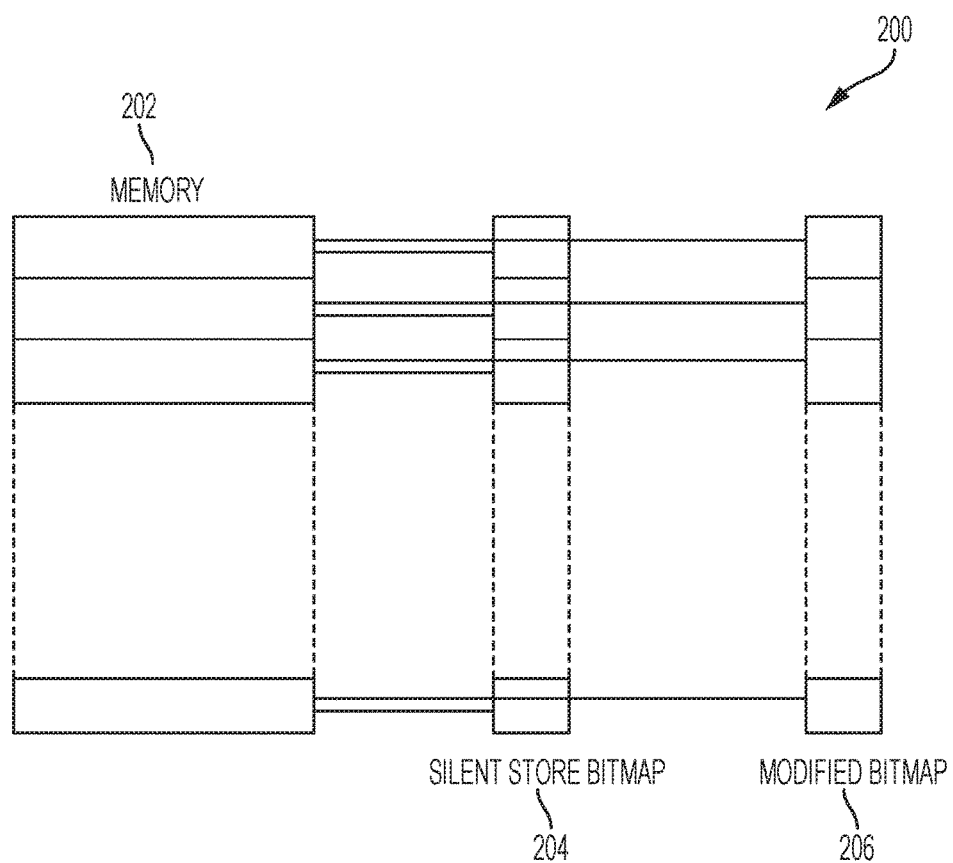
FIG. 2 is a block diagram of a memory and a silent store bitmap in accordance with an embodiment.

Turning now to FIG. 2, a block diagram 200 of a memory 202, a silent store bitmap 204, and a modified bitmap 206 is generally shown in accordance with an embodiment. In an embodiment, each section of the memory 202 corresponds to one bit in the silent store bitmap 204 and one bit in the modified bitmap 206. The size of the section can vary and can be based on the number of bytes (or bits) that are read from the memory 202 as a single unit and written to the memory 202 as a single unit. In an embodiment where a DRAM line (the amount read or written as a unit) is 16 bytes, each section can contain 16 bytes of data to match the size of the DRAM line. In this embodiment, a destructive write of DRAM requires the full 16-byte line to be read. Embodiments can implement sections of any size (e.g., 4 bytes, 8 bytes, 128 bytes, etc.), with the size varying based on implementation requirements. In embodiments, each section is individually addressable via a memory address and also referred to herein as a memory location. Thus, each memory address corresponds to a bit in the silent store bitmap 204 and to a bit in the modified bitmap 206. In embodiments the silent store bitmap 204 and the modified bitmap 206 can vary in size based on the size of the sections and the memory 202. In one embodiment, the silent store bitmap 204 and the modified bitmap each contain 32 bytes.

Figure 3:
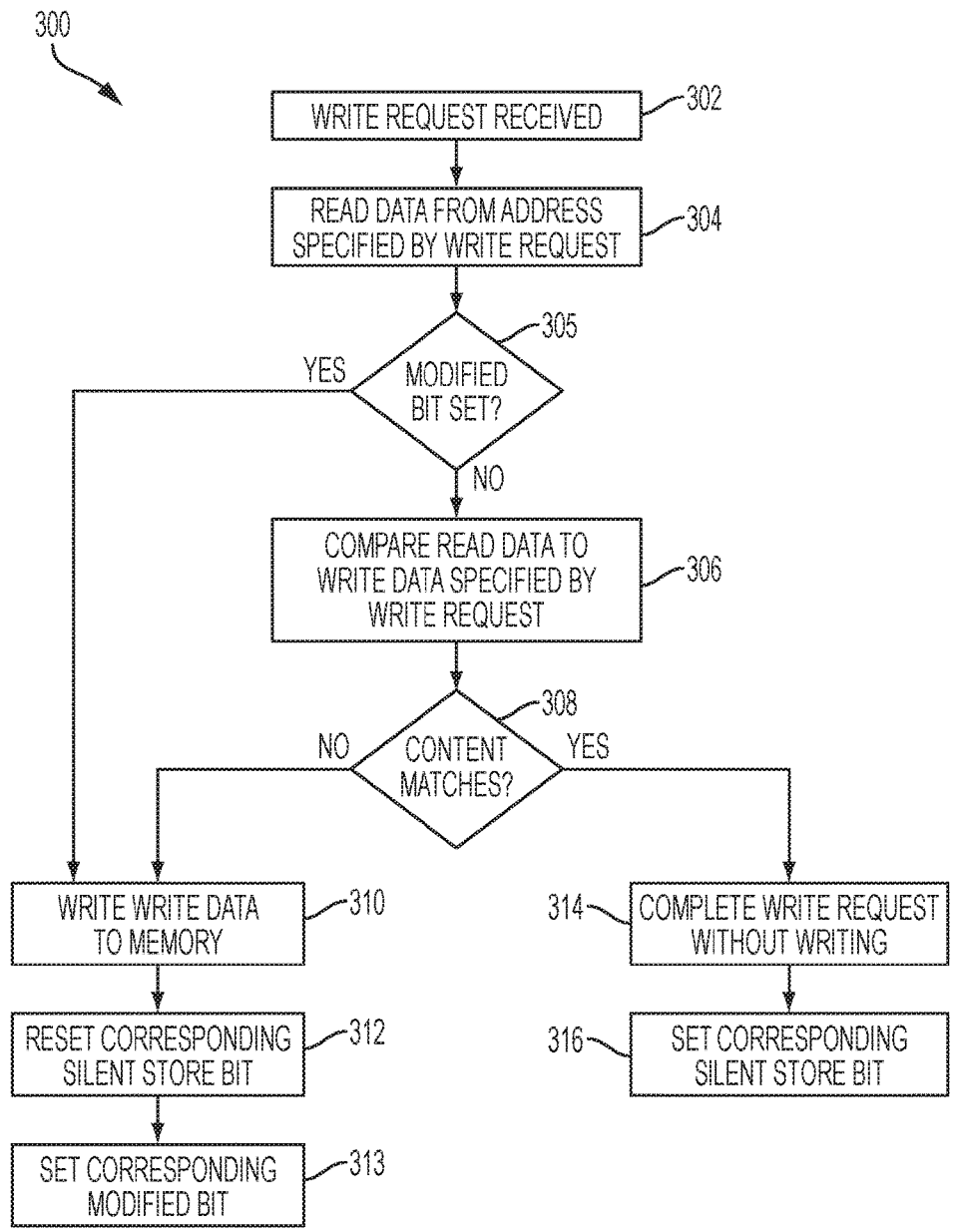
FIG. 3 is a flow diagram of a process for silent store detection and recording in memory storage in accordance with an embodiment.

Turning now to FIG. 3, a flow diagram 300 of a process for silent store detection and recording in memory storage is generally shown in accordance with an embodiment. In an embodiment, the process shown in FIG. 3 can be implemented by instructions located on a memory controller and/or processor. At block 302, a write request that can include a memory address and write data is received. At block 304, the stored data (or read data), together with the corresponding modified bit and silent store bit, is read from a memory location at the memory address specified by the write request. At 305, if it is determined that the memory block has already been modified, then the processing continues at block 310, otherwise the processing continues to block 306. At block 306, the stored data (or read data) is compared to the write data specified by the write request. If it is determined, at block 308 that the content matches, then a silent store has been detected and processing continues at blocks 314-316. If it is determined, at block 308 that the content does not match, then a silent store has not been detected and processing continues at blocks 310-313.

At block 310 of FIG. 3, based on the stored data not matching the write data (i.e., the write does not cause a silent store), the write data is written to the memory location. In an embodiment, a corresponding bit in the silent store bitmap can be reset, at block 312, to indicate that the write data was written. At block 313, the corresponding bit in the modified bitmap can be set.

In an embodiment, the write at block 310 is performed only when the stored data does not match the write data. In this embodiment, when block 310 is performed after block 305 results in a "yes" (e.g., the modified bit is set), the stored data is compared to the write data prior to block 310 being performed and the writing at block 310 occurs only when the stored data does not match the write data. When the stored data does not match the write data, the process flows from block 305 to block 312.

At block 314 of FIG. 3, the write request is completed without writing the write data to the memory location. The process can include determining whether any previous write requests resulted in a write to the memory location and at block 316, and based on determining that the previous write requests did not result in a write to the memory location, the silent store bit that corresponds to the memory address is set in the silent store bitmap to indicate that the write request was completed without writing the write data to the memory. In embodiments, the determining whether previous write requests specifying the memory address resulted in a write to the memory location includes looking as far back as a specified time frame, a specified number of total writes to the memory system, and/or since the last initialization of the silent store bitmap. In embodiments, and as described below with reference to FIG. 4, a modify bit associated with the memory address can be used to determine whether the memory location was previously updated.

In an embodiment, the bits in a silent store bitmap are reset when the silent store bitmap is initialized. In addition, the bits in the silent store bitmap can be reset after events that include, but are not limited to: a checkpoint is completed, after an application has completed execution, and/or after contents of the memory have been transmitted to another processor. In an embodiment, during an initialization of the silent store bitmap all of the bits are reset (e.g., to "0"). When a silent store occurs, the corresponding bit in the silent store bitmap is set (e.g., to "1").

In an embodiment, the bits in a modified bitmap are reset when the modified bitmap is initialized. In addition, the bits in the modified bitmap can be reset after events that include, but are not limited to: a checkpoint is completed, after an application has completed execution, and/or after contents of the memory have been transmitted to another processor. In an embodiment, during an initialization of the modified bitmap all of the bits are reset (e.g., to "0"). When a non-silent store occurs (i.e., a physical write to the memory occurs), the corresponding bit in the modified bitmap is set (e.g., to "1").

In embodiments, the silent store bitmap and the modified bit map are initialized at the same time. Also, in embodiments, the bits in the silent store bitmap and the modified bitmap are reset in response to the same events.

In embodiment, the silent store bitmap and the modified bitmap are made accessible to an application and/or to an operating system. In an embodiment, access is provided via memory mapped I/O, such that the OS or user can access the silent store and modified bitmaps through memory access instructions (e.g., load and store instructions) or a direct memory access (DMA) engine. A mapping data structure that establishes a data memory addresses to an address where the data memory's corresponding silent store bit and modified bit are located is maintained in the OS. In one embodiment, a mapping of a data virtual address page to its corresponding modified and silent store bitmap is maintained in OS, and individual modified and silent store bits can be located by using lower bits of the data virtual address as a bit position offset to the corresponding bitmap. The access method through memory mapped I/O also enables an OS the ability to reset the silent store and modified bitmaps, at the beginning of a checkpoint cycle or memory initialization.

Turning now to FIG. 4, a block diagram of a state diagram 400 of settings for a modified bit and a silent store bit is generally shown in accordance with an embodiment. In embodiment, a modify bit associated with the memory address can be used to determine whether the memory location was not previously updated. The modify bit can be stored in the memory with the stored data, for example, as metadata, and included as part of the read data from the memory location.

As shown in the state diagram 400 of FIG. 4, a modified bit initial state 402, a silent store bit initial state (from the silent state bitmap), and an incoming store state 406 (i.e., silent store or not a silent store) are input to the state diagram 400. Output from the state diagram 400 are a new modified bit state 408 and a new silent store bit 410. For example, if the modified bit initial state 402 is "0" (the memory address has not been previously modified), the silent store bit initial state 404 is "0" (the last store was not a silent store), and the incoming store state 406 is a silent store, then the result is that the new modified bit state 408 is "0" and the new silent store bit 410 is set to "1" to indicate that a silent store has occurred. As shown in the state diagram, the only time that the silent store bit can have a value of "1" is when the modified bit initial state 402 is "0" (the memory location was not previously modified) and the incoming store state 406 is a silent store.

Figure 5:
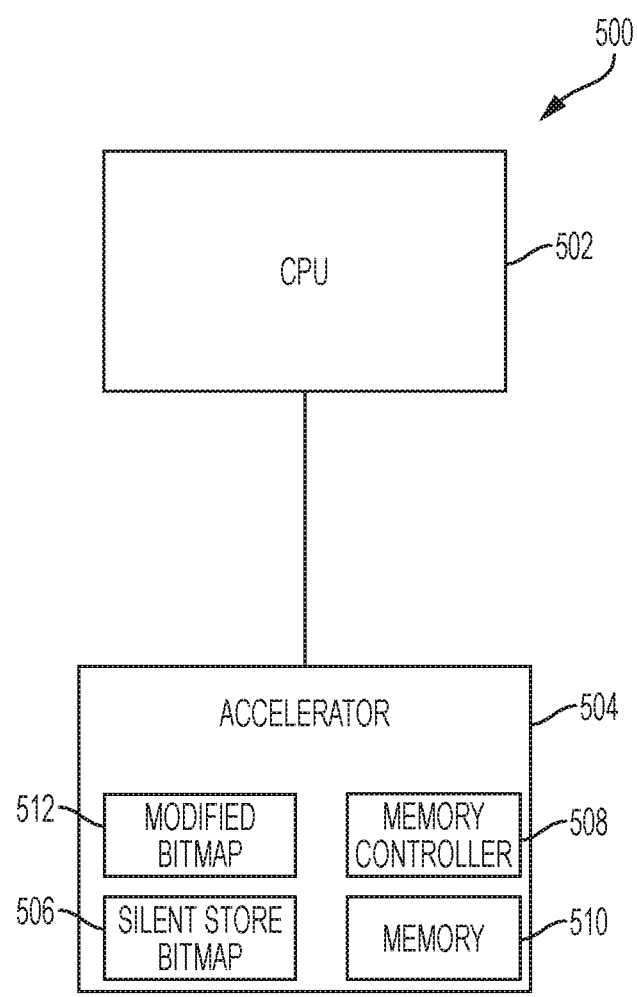
FIG. 5 is a block diagram of a system for silent store detection and recording in memory storage in accordance with an embodiment.

Turning now to FIG. 5, a block diagram of a system 500 for silent store detection and recording in memory storage is generally shown in accordance with an embodiment. The system 500 includes an accelerator 504 that executes an application and/or operating system (OS) that can request access to data stored in a memory 510. Requests of reads or writes to the memory 510, from the accelerator 504, are sent to a memory controller 508 for processing. The memory controller 508 can perform a number of tasks including, but not limited to, translation of virtual addresses to real addresses, and buffering of requests. In embodiments described herein, the memory controller 508 can also perform silent store detection and recording using the silent store bitmap 506 and the modified bitmap 512.

In an embodiment, the memory 510 is main memory that is internal to the accelerator 504 and implemented by a dynamic random access memory (DRAM) device. In an embodiment, the silent store bitmap 506 and/or modified bitmap 512 is stored on a DRAM and/or static random access memory (SRAM) device. In embodiments, the silent store bitmap 506 and/or the modified bitmap 512 is located in the memory 510.

In an embodiment, such as that shown in FIG. 5, that includes a heterogeneous system that includes a processor 502 (e.g., a general purpose processor or host processor) and an accelerator 504 such as a graphics processing unit (GPU), the accelerator 504 can send computer information (e.g., data) back to the CPU 502 at the end of computation in certain time steps. With silent store record according to embodiments described herein, the accelerator 504 can send only data that are different from the data that the CPU 502 already received in the last time step. For a user application, sending data back infrequently can result in a stall latency, while sending data back too frequently results in inefficiency (more transfers of the same data). By using embodiments of the silent store profiling described herein, a user (or computer if automated) can determine an optimal, adaptive time step to schedule sending back of data.

Figure 6:
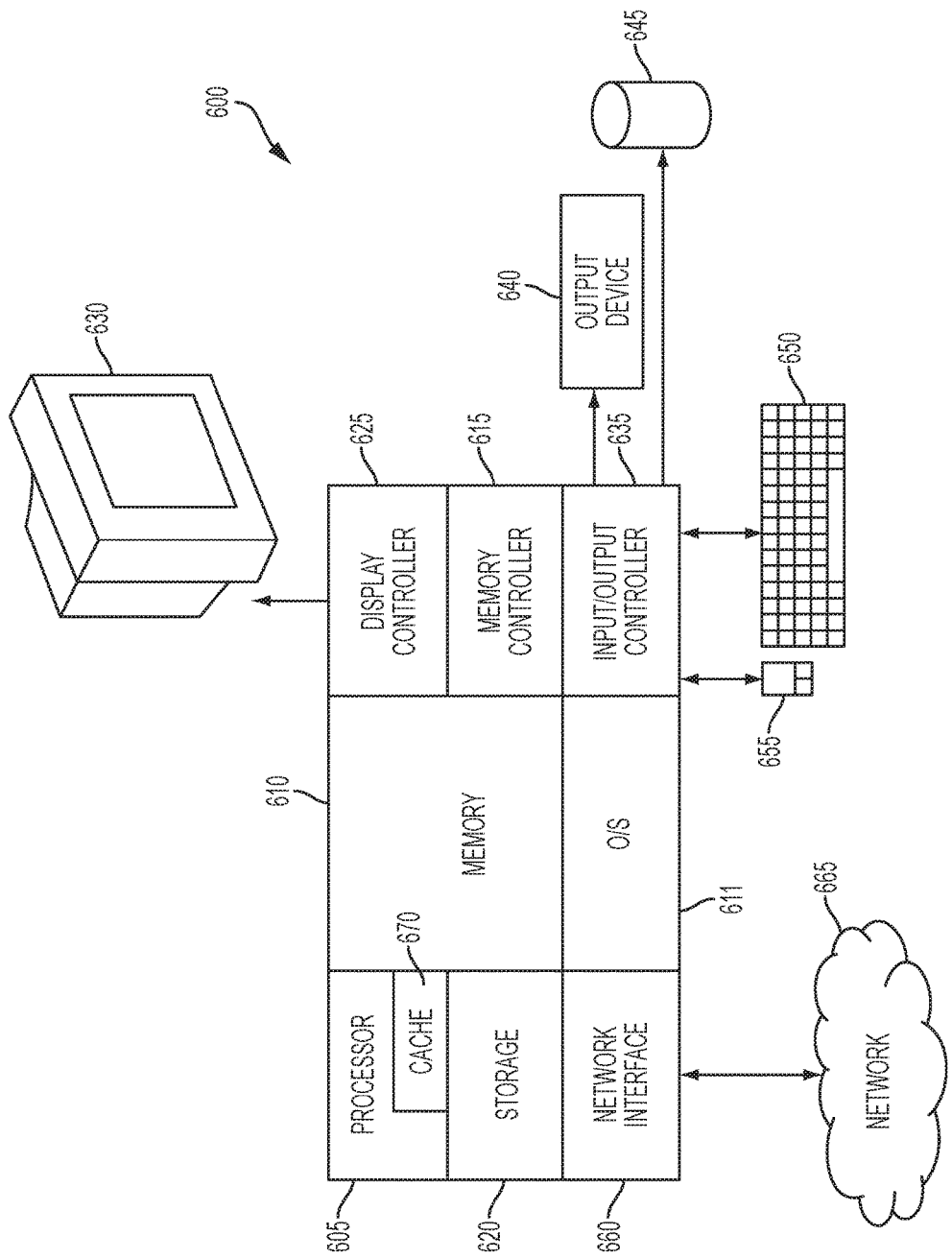
FIG. 6 is a block diagram of a computing device for implementing some or all aspects of the system for silent store detection and recording in memory storage in accordance with an embodiment.

Turning now to FIG. 6, a block diagram of a computer system 600 for use in implementing some of all aspects of the system for silent store detection and recording in memory storage is generally shown according to some embodiments. The processing described herein may be implemented in hardware, software (e.g., firmware), or a combination thereof. In an exemplary embodiment, the methods described may be implemented, at least in part, in hardware and may be part of the microprocessor of a special or general-purpose computer system 600, such as a personal computer, workstation, minicomputer, or mainframe computer.

In an exemplary embodiment, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. A conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the dispatch systems and methods of this disclosure.

The computer system 600 may further include a display controller 625 coupled to a display 630. In an exemplary embodiment, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In an exemplary embodiment, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods to perform to silent store detection and recording in memory storage according to this disclosure may be embodied, in whole or in part, in computer program products or in computer systems 600, such as that illustrated in FIG. 6.

Technical effects and benefits of embodiments include the ability to track and record silent stores at a large granularity when compared to contemporary solutions. In addition, embodiments provide applications and operating systems with visibility into current silent store activity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting and recording silent stores in a memory, the system comprising:
 a memory; and
 a processor communicatively coupled to the memory;
 the processor configured to perform a method comprising:
 receiving a write request, the write request including a memory address and write data;
 reading stored data from a memory location at the memory address;
 determining whether previous write requests specifying the memory address resulted in a write to the memory location, the determining based on a value of a modified bit, in a modified bitmap, that corresponds to the memory address, the modified bit having a value of set when the memory location was previously written to and a value of reset when the memory location was not previously written to;
 based on determining that the memory location was not previously written to:
  comparing the stored data to the write data;
  based on the stored data matching the write data, completing the write request without writing the write data to the memory and setting a silent store bit, in a silent store bitmap, that corresponds to the memory address to indicate that the write request was completed without writing the write data to the memory;
  based on the stored data not matching the write data, writing the write data to the memory location, resetting the silent store bit to indicate that the write request was completed by writing the write data to the memory, and setting the modified bit to indicate that the write request was completed by writing the write data to the memory location;
 based on determining that the memory location was previously written to:
  writing the write data to the memory location, resetting the silent store bit to indicate that the write request was completed by writing the write data to the memory, and setting the modified bit to indicate that the write request was completed by writing the write data to the memory location;
 comparing the stored data to the write data based on determining that the modified bit is set, wherein the writing the write data to the memory location, resetting the silent store bit to indicate that the write request was completed by writing the write data to the memory, and setting the modified bit to indicate that the write request was completed by writing the write data to the memory location based on determining that the memory location was previously written to is further based on the stored data not matching the stored data;
 providing at least one of an application and an operating system access to the silent store bitmap;
 performing a checkpoint, the performing including using the silent store bitmap to determine which memory locations in the memory system to copy as part of the checkpoint; and
 scheduling the checkpoint based on contents of the silent store bitmap;
 wherein silent store bits in the silent store bitmap are reset when the silent store bitmap is initialized and modified bits in the modified bitmap are reset when the modified bitmap is initialized;
 wherein content of the silent store bitmap is accessed by the at least one of the application and the operating system via a memory mapped input/output interface;
 wherein the memory system is included in an accelerator device and contents of the silent store bitmap are used to determine when to send data from at least a portion of the memory locations from the accelerator device to a general purpose device;
 wherein the determining whether previous write requests specifying the memory address resulted in a write to the memory location includes at least one of previous write requests within a specified time frame, previous write requests within a specified number of total writes to the memory system, and previous write requests since a last initialization of the silent store bitmap.

* * * * *